(12) United States Patent
Yamazaki et al.

(10) Patent No.: US 7,918,008 B2
(45) Date of Patent: Apr. 5, 2011

(54) METHOD OF MANUFACTURING COLUMN AND BED OF MACHINE TOOL

(75) Inventors: Tsunehiko Yamazaki, Aichi (JP); Naoomi Miyakawa, Aichi (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 12/482,525

(22) Filed: Jun. 11, 2009

(65) Prior Publication Data
US 2009/0242530 A1   Oct. 1, 2009

Related U.S. Application Data

(62) Division of application No. 11/419,536, filed on May 22, 2006, now Pat. No. 7,739,854.

(51) Int. Cl.
*B23P 11/00* (2006.01)

(52) U.S. Cl. .................. 29/521; 29/524; 52/845

(58) Field of Classification Search .......... 29/521, 29/524; 52/843, 844, 845
See application file for complete search history.

(56) References Cited

U.S. PATENT DOCUMENTS

| 6,907,666 B2 * | 6/2005 | Mills | 29/897.2 |
| 2004/0117965 A1 * | 6/2004 | Mills | 29/428 |

FOREIGN PATENT DOCUMENTS

| DE | 44 15 305 | 11/1995 |
| EP | 1 600 242 | 11/2005 |
| GB | 2 394 691 | 5/2004 |
| JP | 59-173527 | 11/1984 |
| JP | 11-311220 | 11/1999 |
| JP | 2002-521214 | 7/2002 |
| WO | 00/05028 | 2/2000 |
| WO | 2004/067872 | 8/2004 |

OTHER PUBLICATIONS

F. Koenigsberger, "Design Principles of Metal-Cutting Machine Tools", 1971, pp. 249-251.
Special Feature: Welded Structure Design, vol. 11, No. 3, "Applied Mechanical Engineering", Mar. 1, 1970, pp. 80-84.
European Search Report for corresponding Application No. 06405207.9 dated Nov. 7, 2006.
Co-pending U.S. Appl. No. 11/419,536, filed May 22, 2006.
Office Action for corresponding Japanese Application No. 2004-315417 dated May 18, 2010.

* cited by examiner

*Primary Examiner* — Jermie E Cozart
(74) *Attorney, Agent, or Firm* — Renner, Otto, Boisselle & Sklar, LLP

(57) ABSTRACT

A technique of easy manufacture of a column and a bed of a machine tool in a short time is provided by having an assembly structure of sheet metal members. A column body of the machine tool is constituted by combining a front member with a rear member 130 and mounting a side cover. Its inside is reinforced by a plurality of ribs 150, 160. Each of the members is made by precision laser machining of sheet plate materials. The column body is assembled by inserting projection portions provided on one member into slits formed on the other member.

4 Claims, 17 Drawing Sheets

ND OF MANUFACTURING COLUMN
AND BED OF MACHINE TOOL

The present application is a divisional application of U.S. application Ser. No. 11/419,536 filed on May 22, 2006 now U.S. Pat. No. 7,739,854 B2 which is based on Japanese patent application No. 2004-315417 filed on Oct. 29, 2004, the entire contents of which are hereby incorporated by reference.

BACKGROUND OF THE INVENTION

1. Field of the Invention

The present invention relates to a method of manufacturing a column and a bed of a machine tool and a structure thereof.

2. Description of the Related Art

FIG. 1 is an explanatory view showing a basic structure of a machine tool.

A machine tool indicated generally by reference numeral 1 has a saddle 20 supporting a machining head 10 capable of vertical movement, and the saddle 20 is supported by a column 30 capable of horizontal movement.

The column 30 has a motor 40 and moves on a bed 50 in the longitudinal direction. The bed 50 has a construction that a pair of structures are connected to each other by a beam 60.

FIG. 2A shows a conventional manufacturing process of can manufacturing constituting the bed 50 of the machine tool.

A material is cut off in step S10. When plasma fusing is used as means for cutting, for example, a dimensional tolerance is approximately ±1 mm to the fusing of 1000 mm.

The cut off material is provisionally assembled in step S11 and welded in step S12. In step S13, distortion generated by welding is removed. For example, in a lengthy structure with the whole length of approximately 8 m, distortion of not less than 10 mm is normally generated. Moreover, the distortion removal is a work requiring a long time labor by a worker with an extremely advanced skill. This structure is conveyed to annealing equipment in step S14 and annealed in step S15. A shot treatment is applied to the annealed structure, which is conveyed to machining equipment in step S17, given machining in step S18 and completed into the bed 50. This machining has a maximum machining range of not more than 4 m even in a relatively generally-used large-sized machine, and a place for machining is extremely limited for a large-sized work piece exceeding this size.

Construction of a machine tool in a welding can manufacturing structure is disclosed in non-patent documents of "Design Principle of Machine Tool" (1971) written by F. Koenigsberger, translated by Susumu Shiozaki and published by Yokendo and a magazine, "Applied Mechanical Engineering," Special Feature Welded Structure Design, issued on Mar. 1, 1970, Vol. 11, No. 3.

Since a bed or the like of a machine tool is a large-sized structure, conveyance requires labor, and equipment such as a large-sized annealing furnace is needed.

Also, equipment for machining needs a large-sized machine and the number of processes becomes huge. Production time takes a couple of months or more using a conventional process.

An object of the present invention is to provide a method of manufacturing a structural body such as a column and a bed of a machine tool solving the above problems and a structure produced by this manufacturing method.

SUMMARY OF THE INVENTION

A method of manufacturing a column and bed of a machine tool of the present invention comprises as basic means a process for making a sheet metal member by application of laser precision machining to a sheet metal material, a process to give a folding machining to the sheet metal member requiring machining, a process for making a machined member, and a process for assembling the sheet metal member and the machined member.

And a column of a machine tool having an assembly structure of the sheet metal member made by the laser precision machining is provided with a column body extending in the axial direction orthogonal to a movement axis and a column foot member mounted at both ends of the column body, and the column body is provided with a front member and a rear member divided by laser precision machining in a plane in parallel with the axis, a cover covering both ends of a closed sectional space formed by the front member and the rear member and a plurality of ribs arranged inside the front member and the rear member and joined to both members.

Moreover, a bed of the machine tool having the assembly structure of the sheet metal member made by the laser precision machining is provided with an upper unit and a lower unit of the bed, and the lower unit of the bed is provided with side plates extending in the longitudinal direction of the bed and oppositely arranged, a bottom plate covering a bottom portion of the side plates, a rectangular column member arranged on an upper part of the side plates, end face plates covering both ends of the side plates, a plurality of ribs arranged inside and joined to the side plates and a fastening unit for fastening both the side plates.

According to the present invention, a bed or a column of a machine tool, which is a large-sized structure, can be constructed easily by assembling a sheet metal material.

Manufacture of the bed or the column with this assembly structure of the sheet metal members is completed by achieving high accuracy of laser machining.

According to the present invention, such a large-sized structure can be manufactured in 3 to 4 days.

DETAILED DESCRIPTION OF THE PREFERRED EMBODIMENTS

Figure 1:
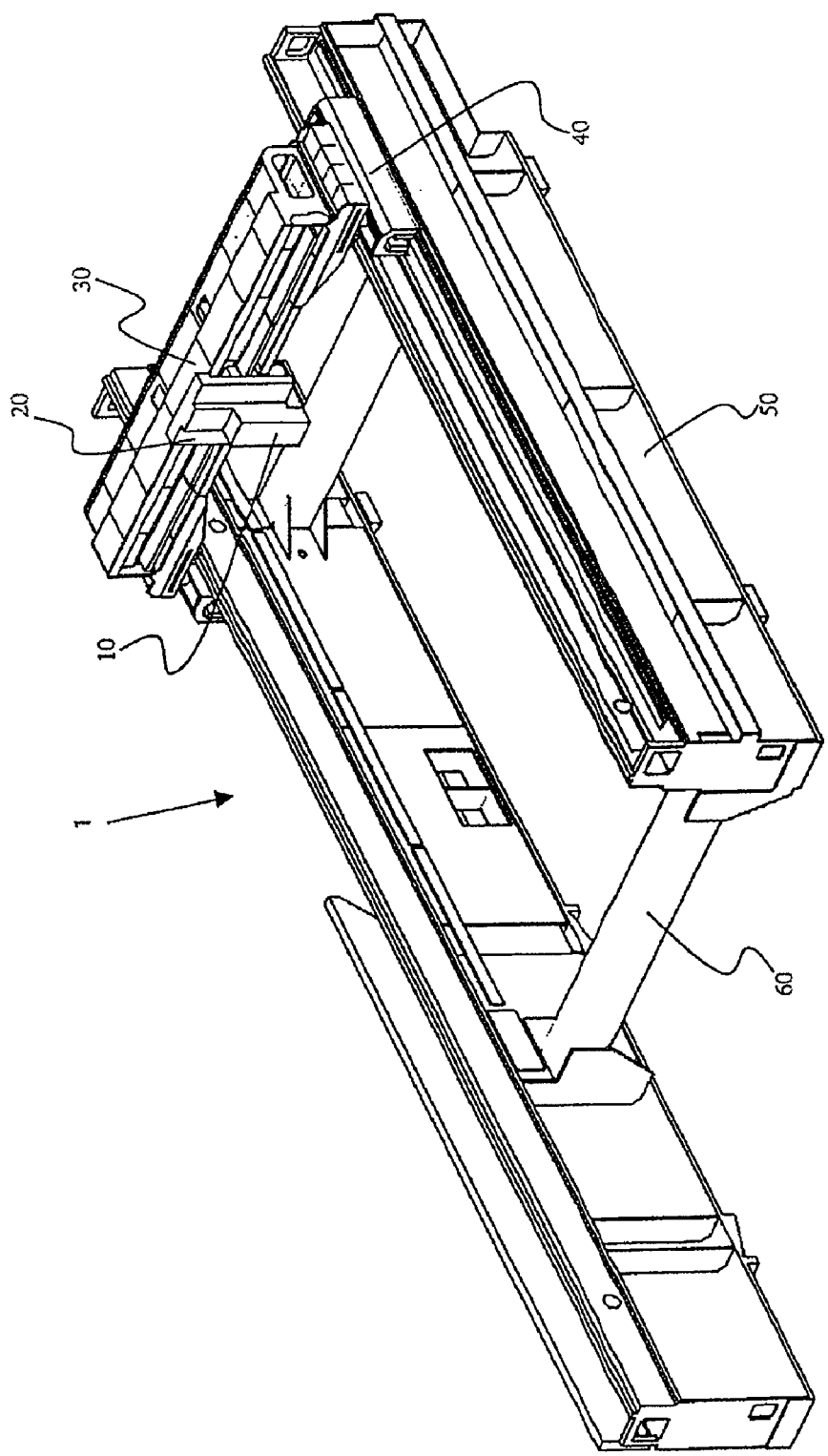
FIG. 1 is an explanatory view showing a basic structure of a machine tool.
Figure 2:
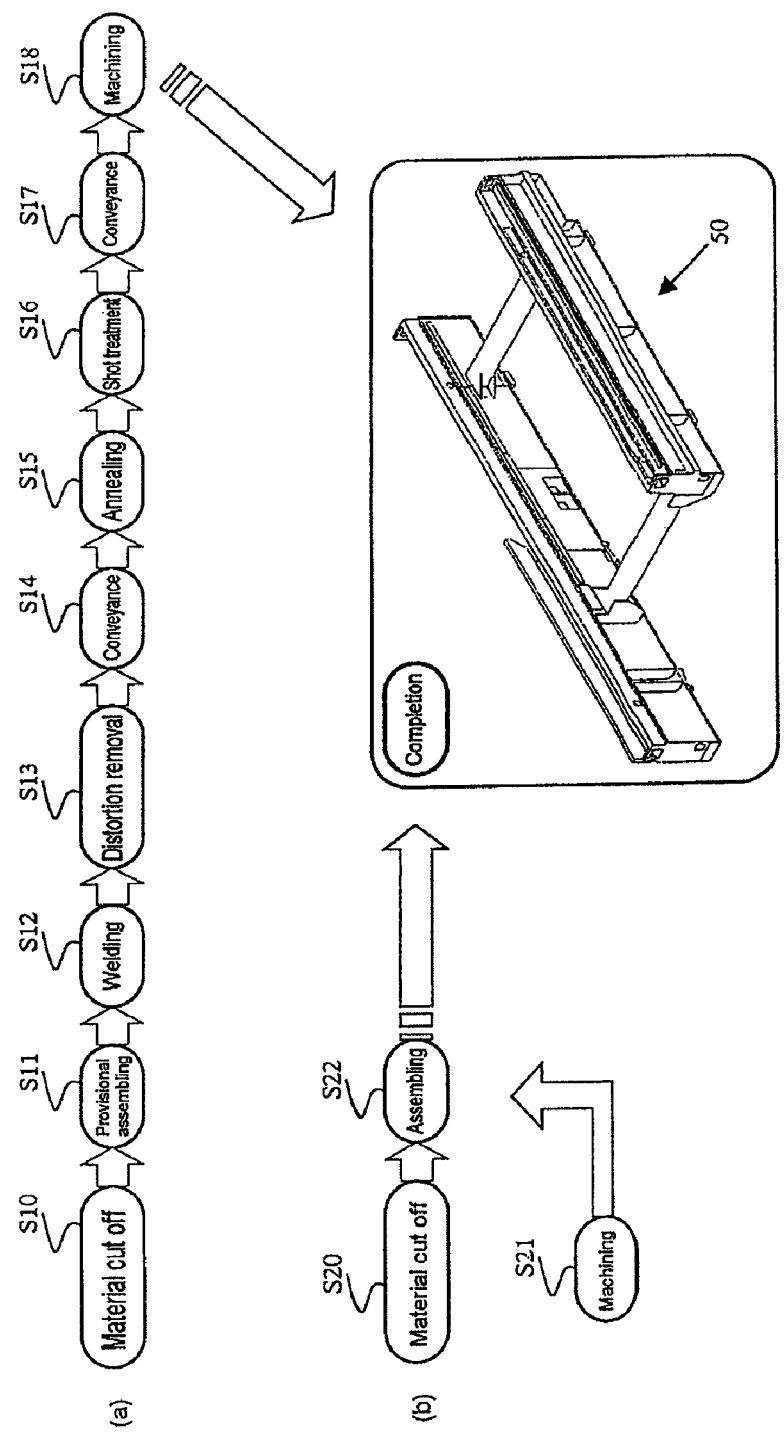
FIG. 2 is a diagram showing a manufacturing process of a bed of the machine tool.

FIG. 2B is an explanatory diagram showing a manufacturing process of a bed according to the present invention.

In step S20, a sheet metal material is cut off to make a required member. Laser precision machining is used as cutting means. The laser precision machining has a dimensional tolerance with a high accuracy of ±0.05 mm with respect to a cut length of 1000 mm. In parallel with this material cutting process, in step S21, a machined member to be assembled to the bed is machined.

In step S22, the bed 50 is completed by assembling a sheet metal member and assembling the machined member.

As mentioned above, according to the present invention, since the laser precision machining can be used, the sheet metal member is machined with a high accuracy including a tenon and a mortice, and by assembling these members, a structure such as a column or a bed can be manufactured easily. Since a fastening member such as a bolt/nut is used for fastening of members, large-scale welding or annealing is not needed. Then, welding distortion or the like is not generated but a structure with a high accuracy can be obtained.

Moreover, since machining can be performed in parallel with laser precision machining, productivity is high and required structures can be manufactured in a short period of time.

A structure and a manufacturing method of a column and a bed according to the present invention will be described below.

Figure 3:
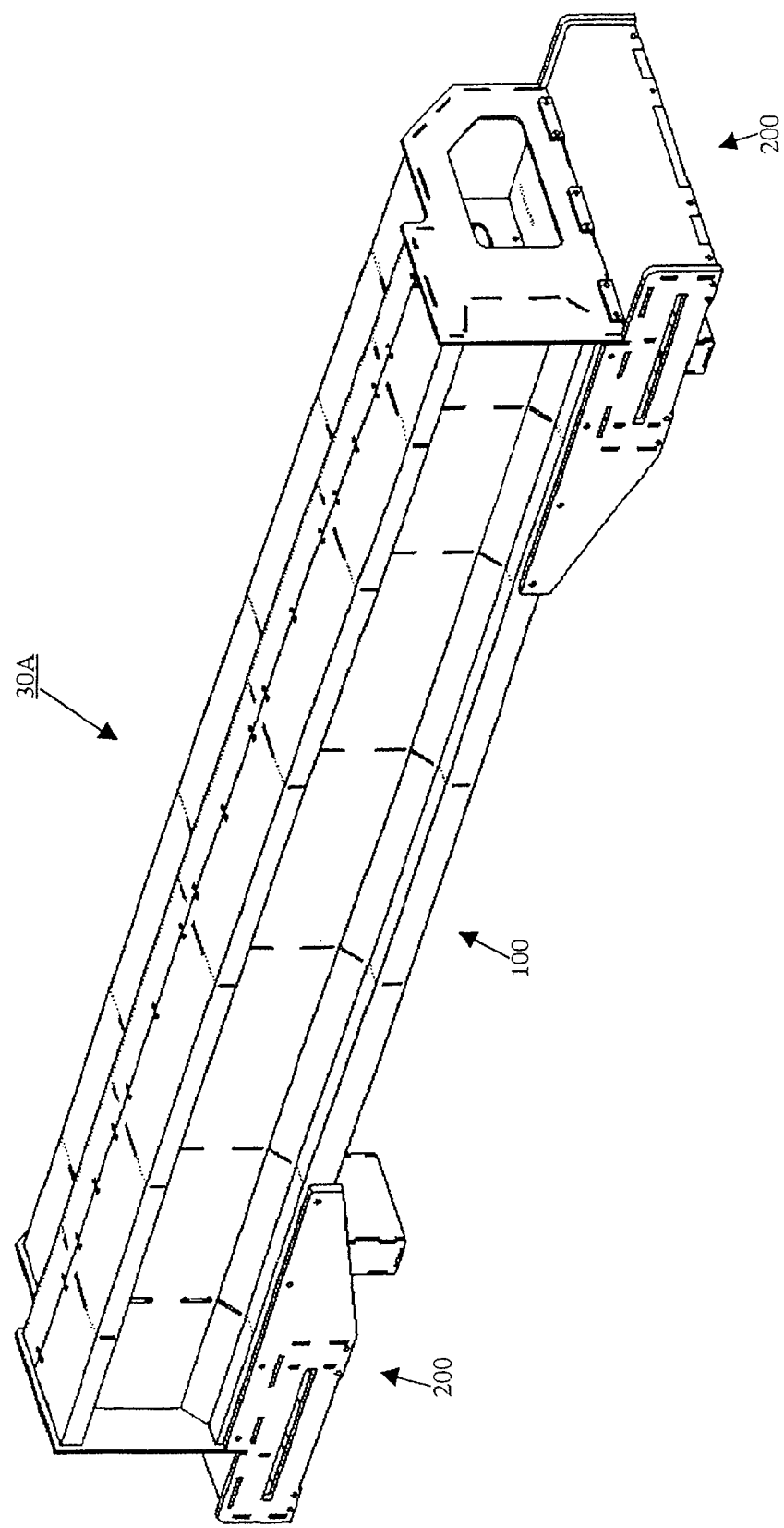
FIG. 3 is an assembled view of a column of the present invention.

FIG. 3 is a perspective view showing an entire construction of a column made by the manufacturing method of the present invention.

A column unit generally referred to as reference character 30A is provided with a column body 100 and column foot members 200 mounted at both side ends of the column body 100.

Figure 4:
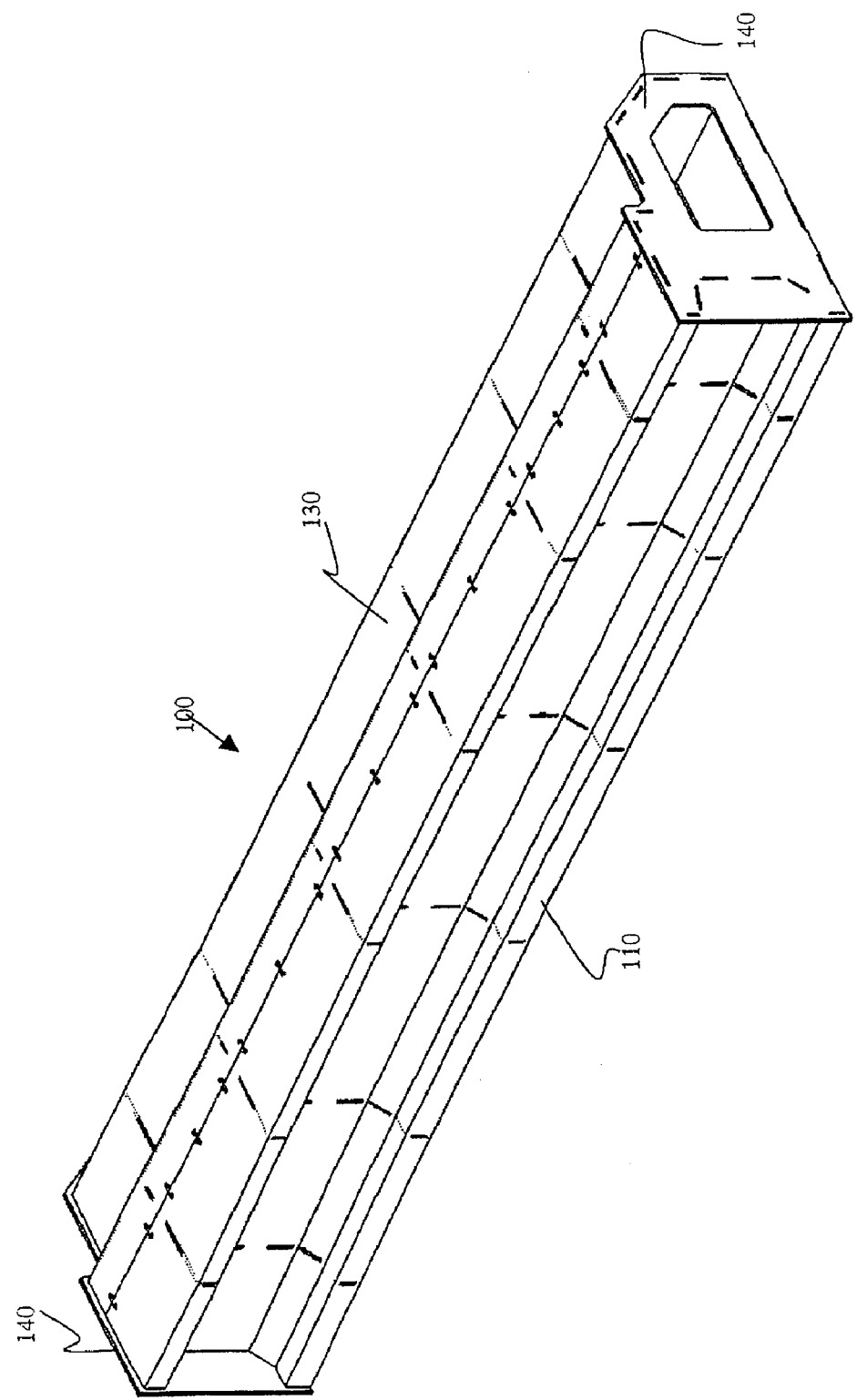
FIG. 4 is an assembled view of a body of the column of the present invention.

FIG. 4 is a perspective view of the column body 100, and the column body 100 has a front member 110, a rear member 130 and side covers 140 mounted on both side ends.

Figure 5:
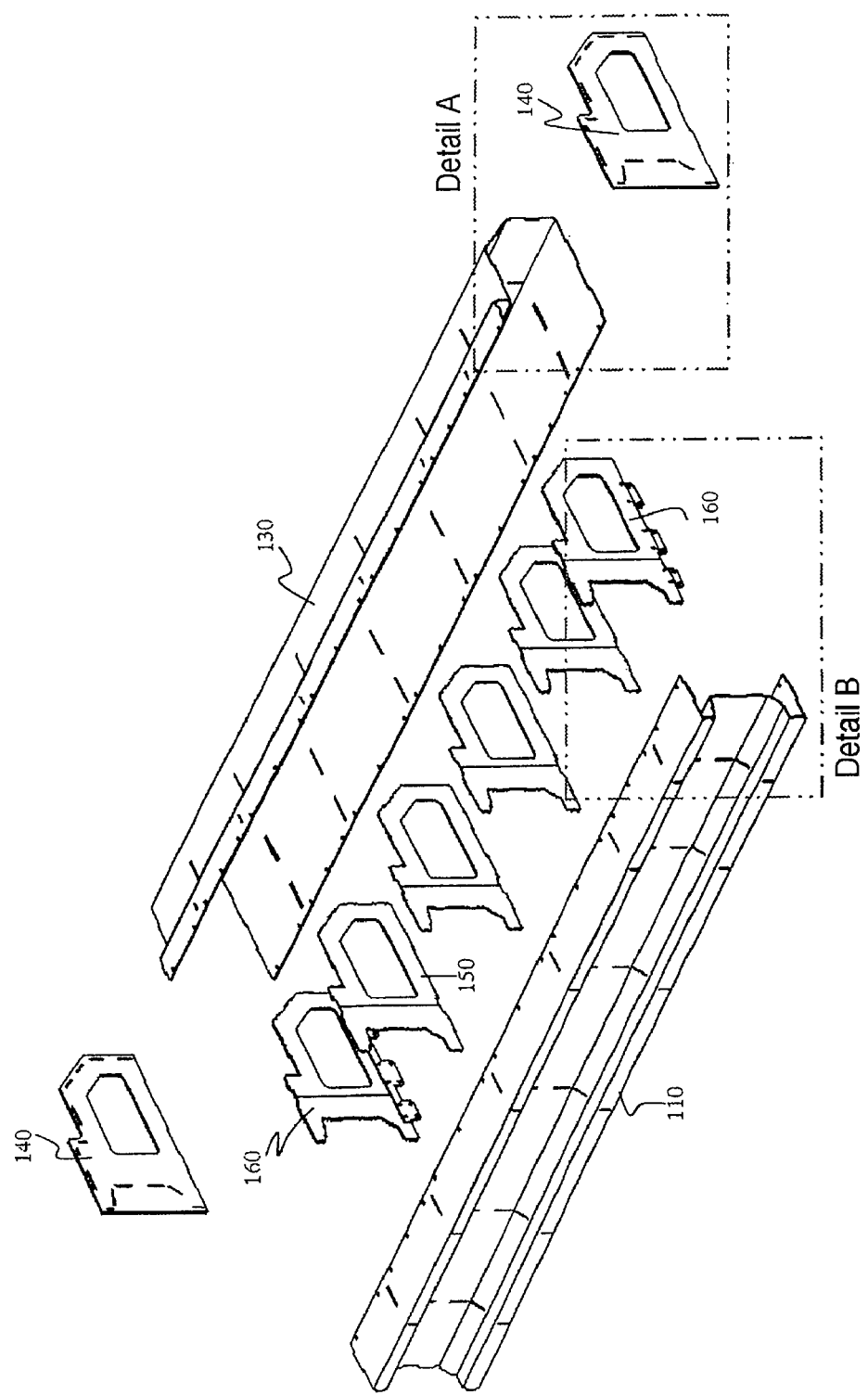
FIG. 5 is an exploded view of the body of the column of the present invention.
Figure 6:
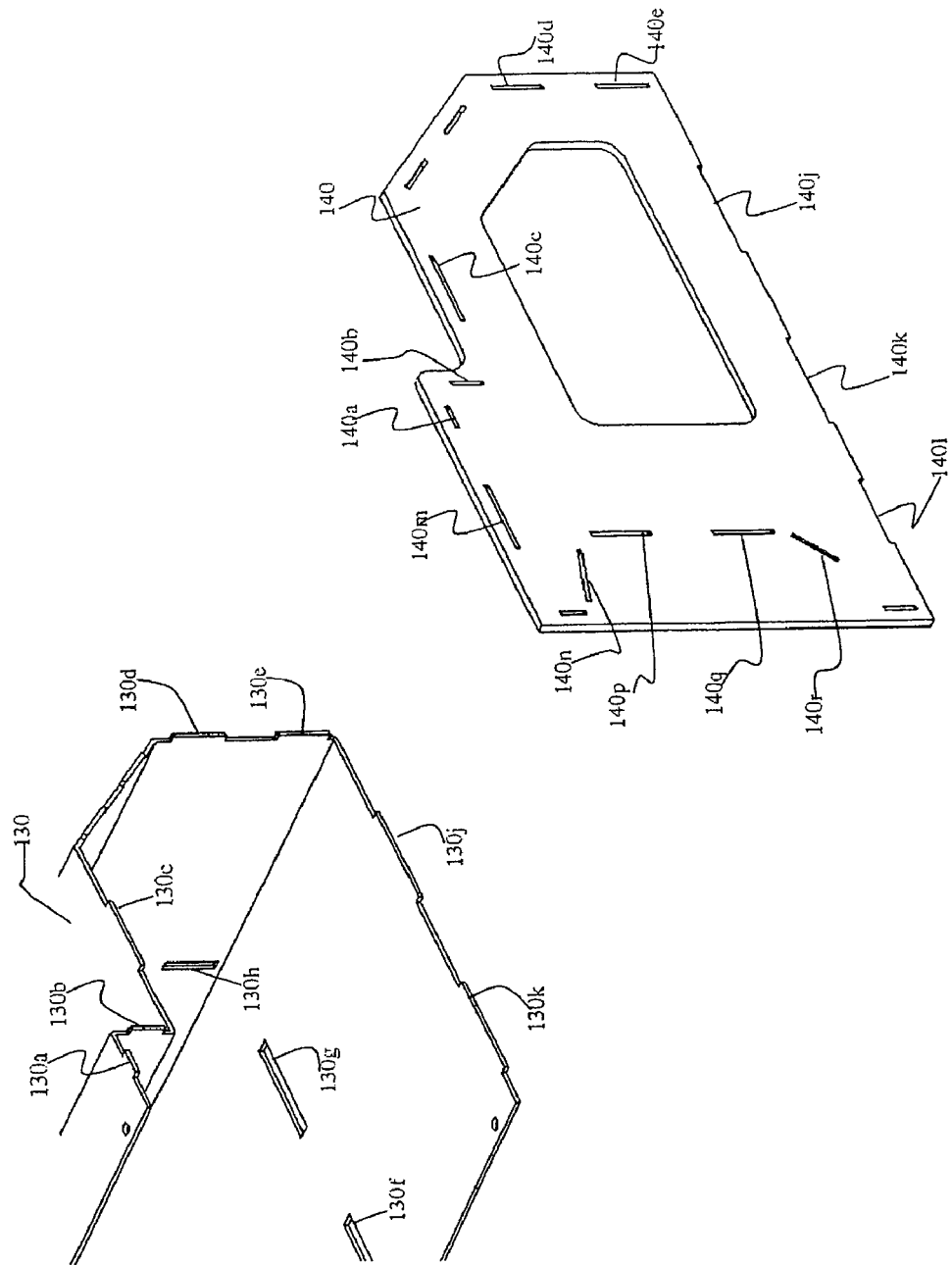
FIG. 6 is a detailed view of A part of FIG. 5.
Figure 7:
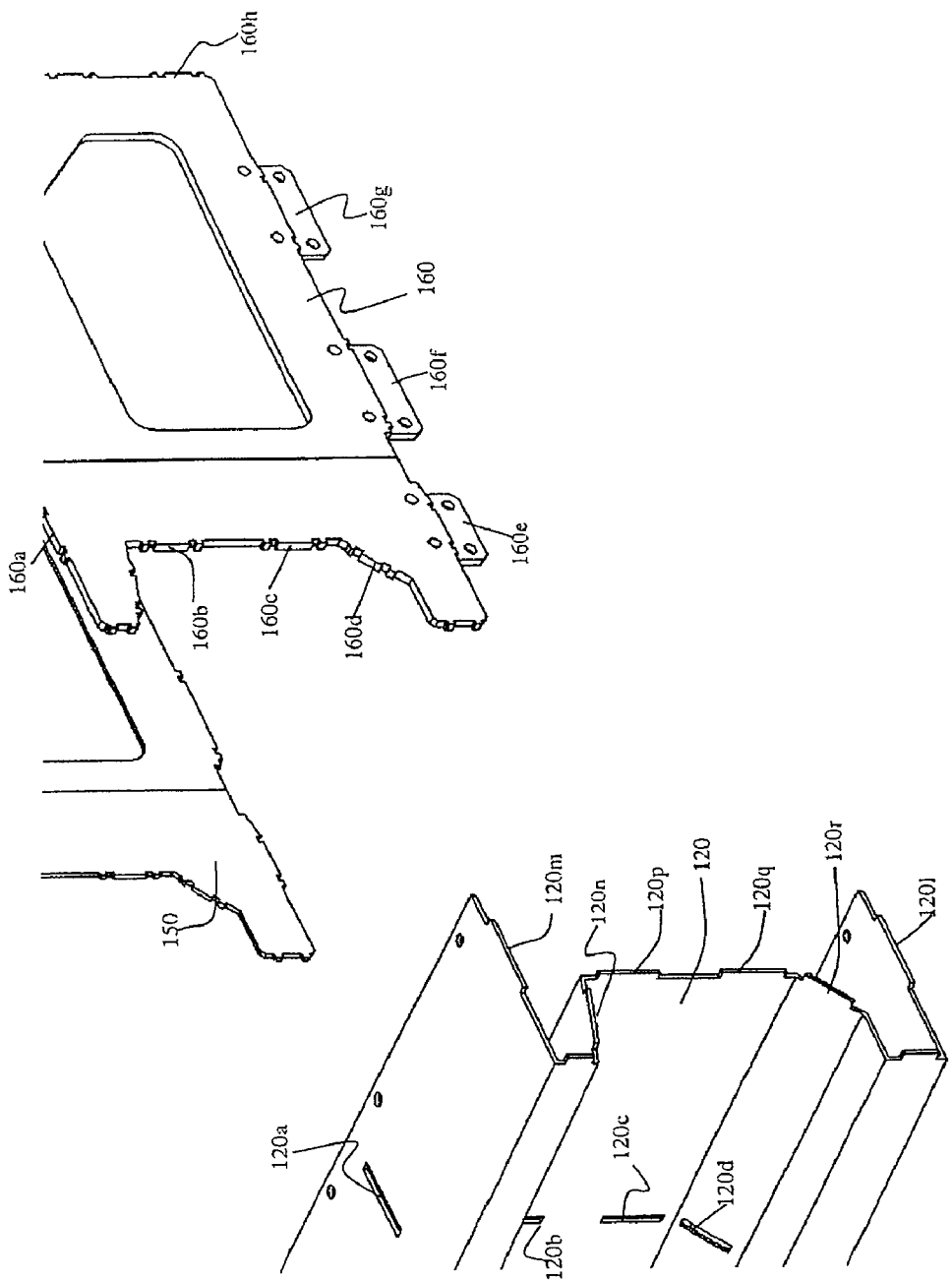
FIG. 7 is a detailed view of B part of FIG. 5.

FIG. 5 is an exploded view of the column body, FIG. 6 is a detailed view of A part in FIG. 5, and FIG. 7 is a detailed view of B part in FIG. 5.

The column body has the front member 110 obtained by folding machining of a plate member and applying a required machining such as a slit and the rear member 130 given the same machining, and two types of ribs 150, 160 are arranged inside a closed sectional space formed by the front member 110 and the rear member 130. And both side ends of the column body are covered by the side covers 140.

FIG. 6 is an explanatory view showing an engagement structure between the column body rear member 130 and the side cover 140, and FIG. 7 is an explanatory view showing an engagement structure between the column body front member 120, the rib 160 and the side cover 140.

On an end of the rear member 130, a plurality of projection portions 130a, 130b, 130c, 130d, 130e, 130j, 130k and so on to be tenons are provided.

On the other hand, on the side cover 140, a plurality of slits 140a, 140b, 140c, 140d, 140e, 140m, 140n, 140p, 140q, 140r and so on to be mortices and recess portions 140j, 140k, 140l are formed.

The projection portion 130a of the rear member 130 is inserted into the slit 140a of the side cover 140 and fixed. Similarly, each of the projection portions 130b, 130c, 130d, 130e of the rear member 130 is inserted into the slits 140b, 140c, 140d, 140e of the side cover 140 and fixed. Moreover, the projection portions 130j, 130k of the rear member 130 are engaged with the recess portions 140j, 140k of the side cover 140.

The rear member 130 has slits 130f, 130g, 130h into which a projection portion of the rib 160 is inserted, which will be described referring to FIG. 7.

In FIG. 7, the front member 120 has a plurality of projection portions 120m, 120n, 120p, 120q, 120r, 120l on the end, while slits 120a, 120b, 120c, 120d and so on are formed on a face plate portion.

The projection portions 120m, 120n, 120p, 120q, 120r on the end are inserted and fixed to the corresponding slits 140m, 140n, 140p, 140q, 140r on the side cover 140 as described referring to FIG. 6.

The rib 160 is provided with a plurality of projection portions 160a, 160b, 160c, 160d, 160e, 160f, 160g, 160h on its outer edge portion.

The projection portions 160a, 160b, 160c, 160d of the rib 160 are inserted and fixed to the corresponding slits 120a, 120b, 120c, 120d of the front member 120, respectively.

The projection portion 160e on the bottom portion of the rib 160 is inserted into a slit, not shown, formed on the bottom portion of the front member 120 and fixed.

Similarly, the projection portions 160f, 160g, 160h of the rib 160 are inserted and fixed to the corresponding slits 130f, 130g, 130h of the rear member 130.

The column body is assembled by the above-mentioned fastening structure.

Figure 8:
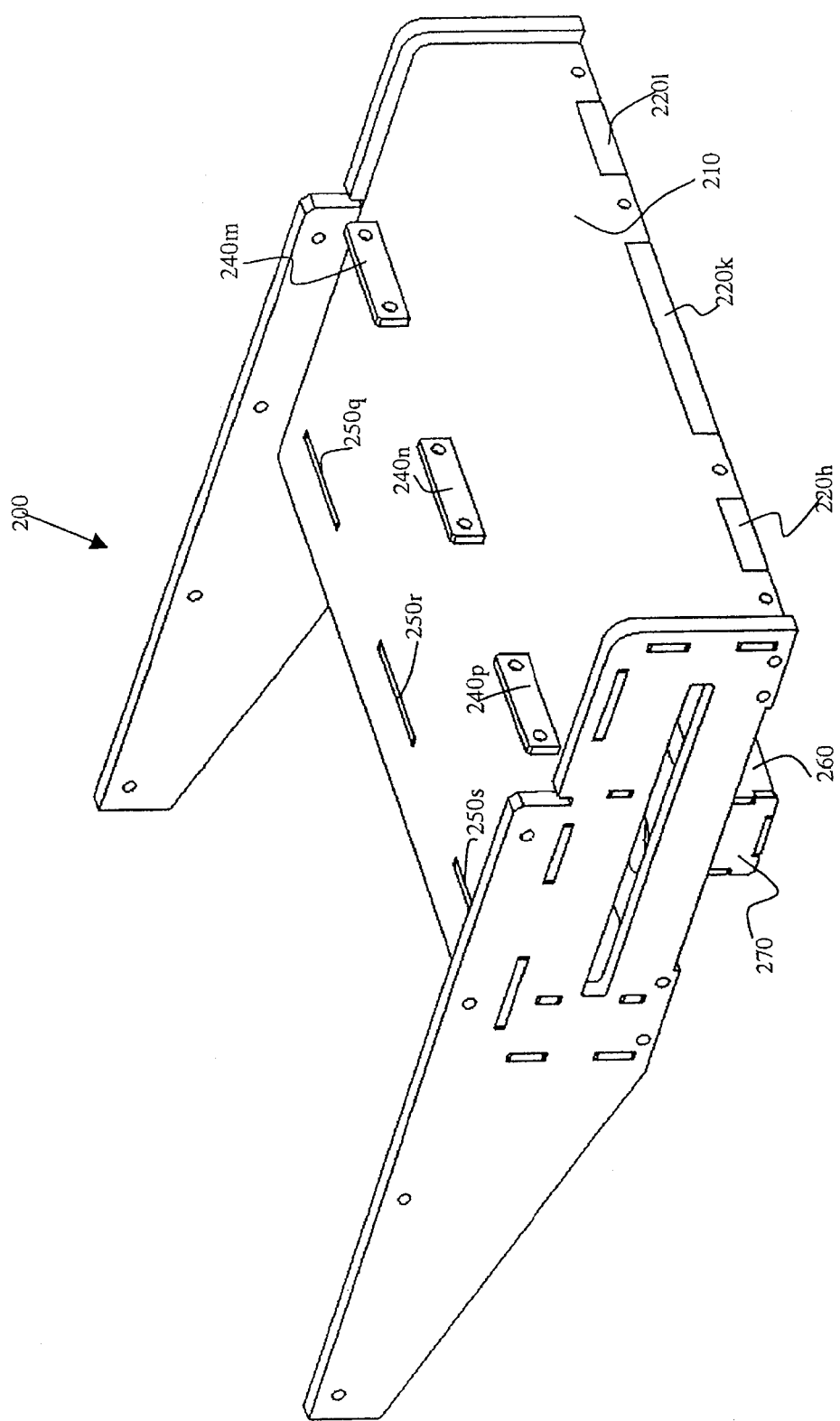
FIG. 8 is an assembled view of a column foot member.
Figure 9:
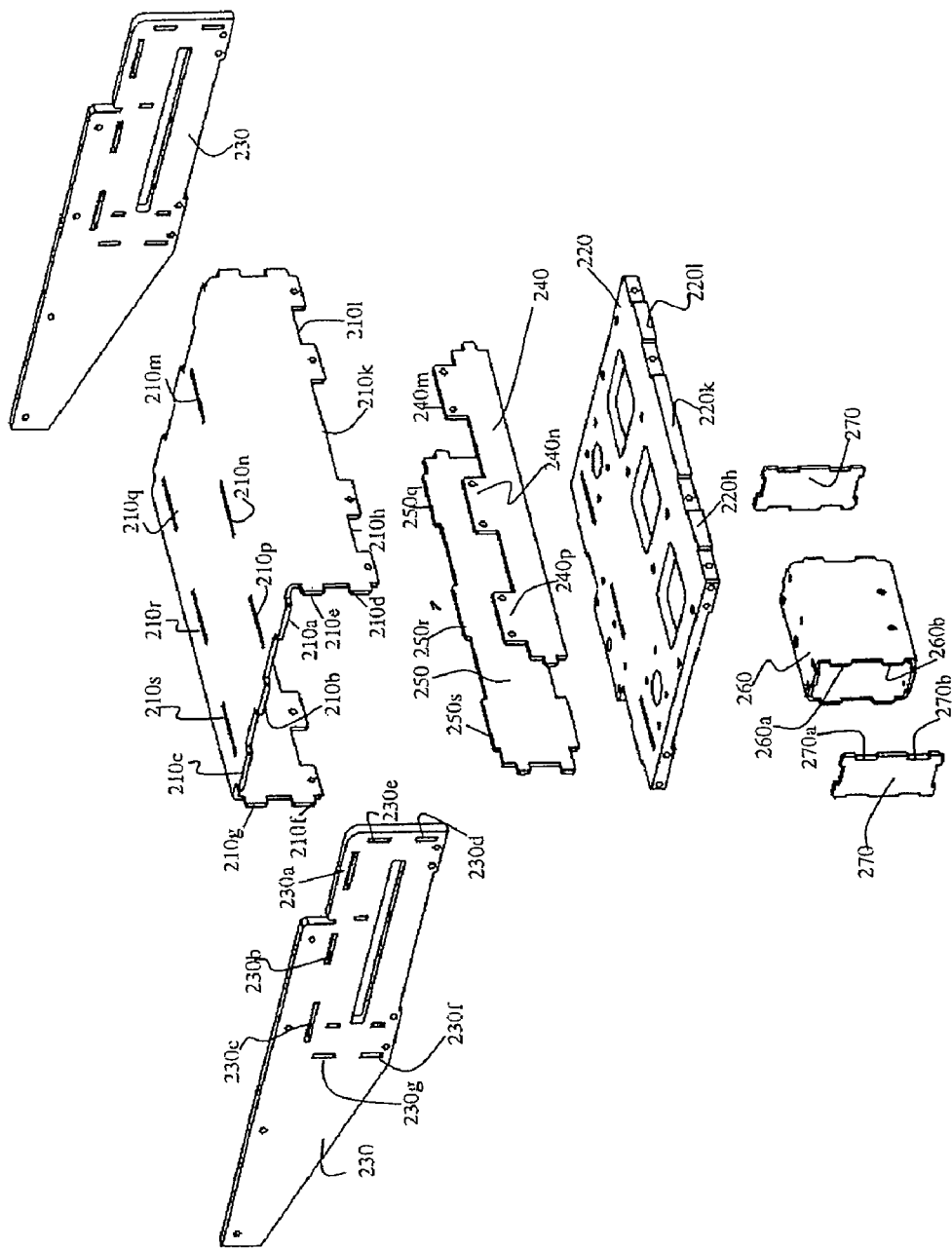
FIG. 9 is an exploded view of the column foot member.

FIG. 8 is a perspective view of the column foot member 200, and FIG. 9 is an exploded view of the column foot member.

The column foot member generally referred to as reference numeral 200 has a foot body 210, a bottom plate 220, a body cover 230, two types of ribs 240, 250, a stopper 260 and a stopper cover 270.

As shown in FIG. 9, each member constituting the column foot member is made by precision laser machining of a sheet metal and by folding required portions.

The foot body 210 has projection portions 210a, 210b, 210c, 210d, 210e, 210f, 210g on both sides and has recess portions 210h, 210k, 210l at a bent lower end.

Moreover, on the upper surface, slits 210m, 210n, 210p, 210q, 210r, 210s are formed.

The bottom plate 220 has projection portions 220h, 220k, 220l to be engaged with corresponding recess portions 210h, 210k, 210l of the body 210.

The body cover 230 has a plurality of slits 230a, 230b, 230c, 230d, 230e, 230f, 230g and soon formed. The projection portions 210a, 210b, 210c, 210d, 210e, 210f, 210g of the foot body 210 are inserted into the corresponding slits 230a, 230b, 230c, 230d, 230e, 230f, 230g of the body cover 230, respectively.

The rib 240 has projection portions 240m, 240n, 240p on an upper part, and each of the projection portions is inserted into the corresponding slits 210m, 210n, 210p of the foot body 210. The projection portions 240m, 240n, 240 p pierce the upper surface of the foot body 210 and project upward.

The rib 250 has projection portions 250q, 250r, 250s on an upper part, which are inserted into the corresponding slits 210q, 210r, 210s of the foot body 210.

The stopper 260 is folded in a rectangular column shape, and a plurality of projection portions 260a, 260b and so on are provided at an end. The stopper cover 270 has corresponding recess portions 270a, 270b and so on, and the stopper covers 270 are engaged with both sides of the stopper 260.

The column of the present invention has the above-described construction, and the entire unit is assembled by preparing sheet metal members made by precision laser machining and inserting projection portions provided at required locations into the slits.

The constituent members are all sheet metal members, and machining can be automated and required units can be produced in a short time.

Figure 10:
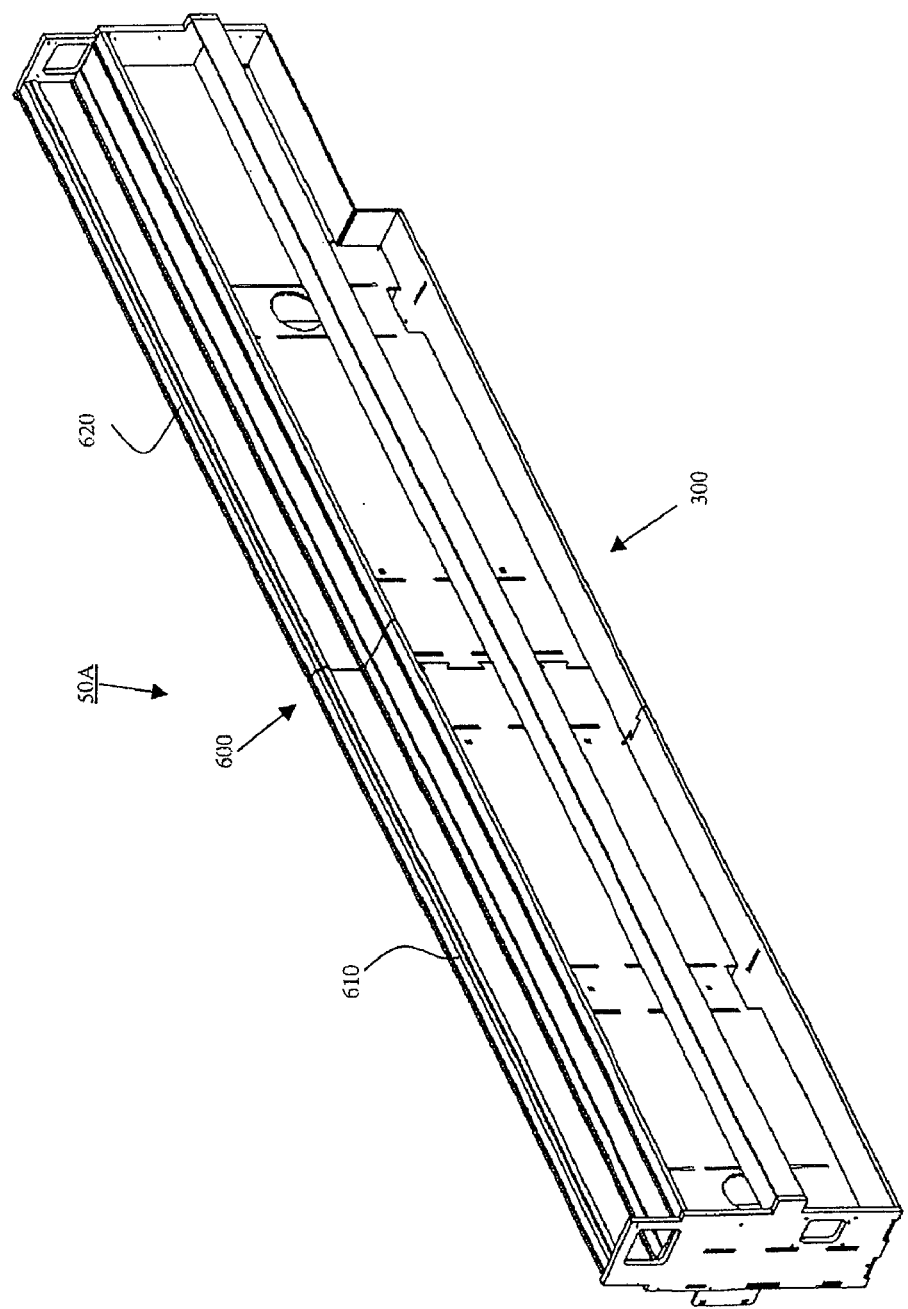
FIG. 10 is an assembled view of a bed of the present invention.

FIG. 10 is a perspective view of a bed unit.

The bed unit generally referred to as reference character 50A is constituted by a bed lower portion 300 and a bed upper portion 600.

Figure 11:
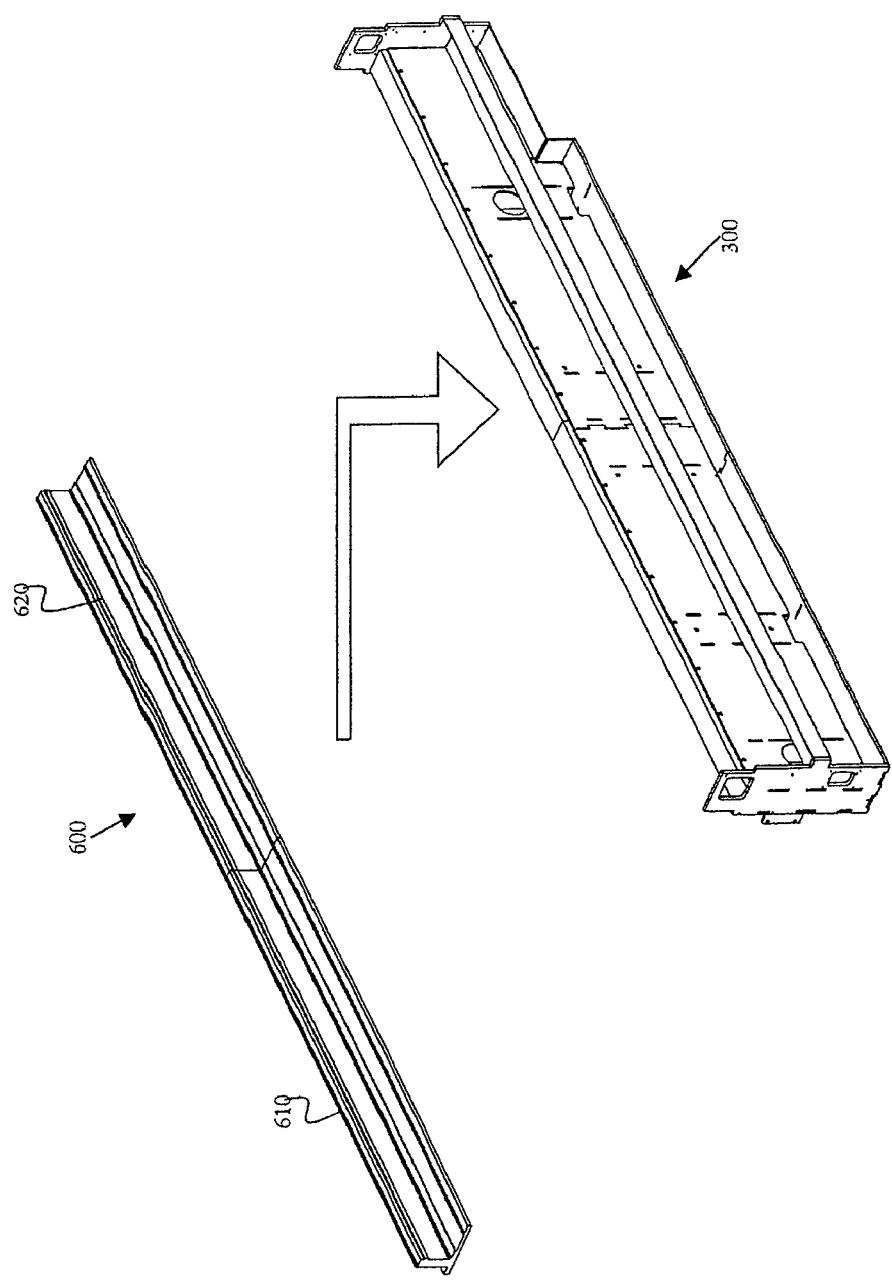
FIG. 11 is an explanatory view of an upper member and a lower member of the bed of the present invention.

FIG. 11 shows an assembly structure of the bed lower unit 300 and the bed upper portion 600 and an assembling procedure to complete the bed unit by assembling upper can machining members 610, 620 after completion of the bed lower unit 300.

Figure 12:
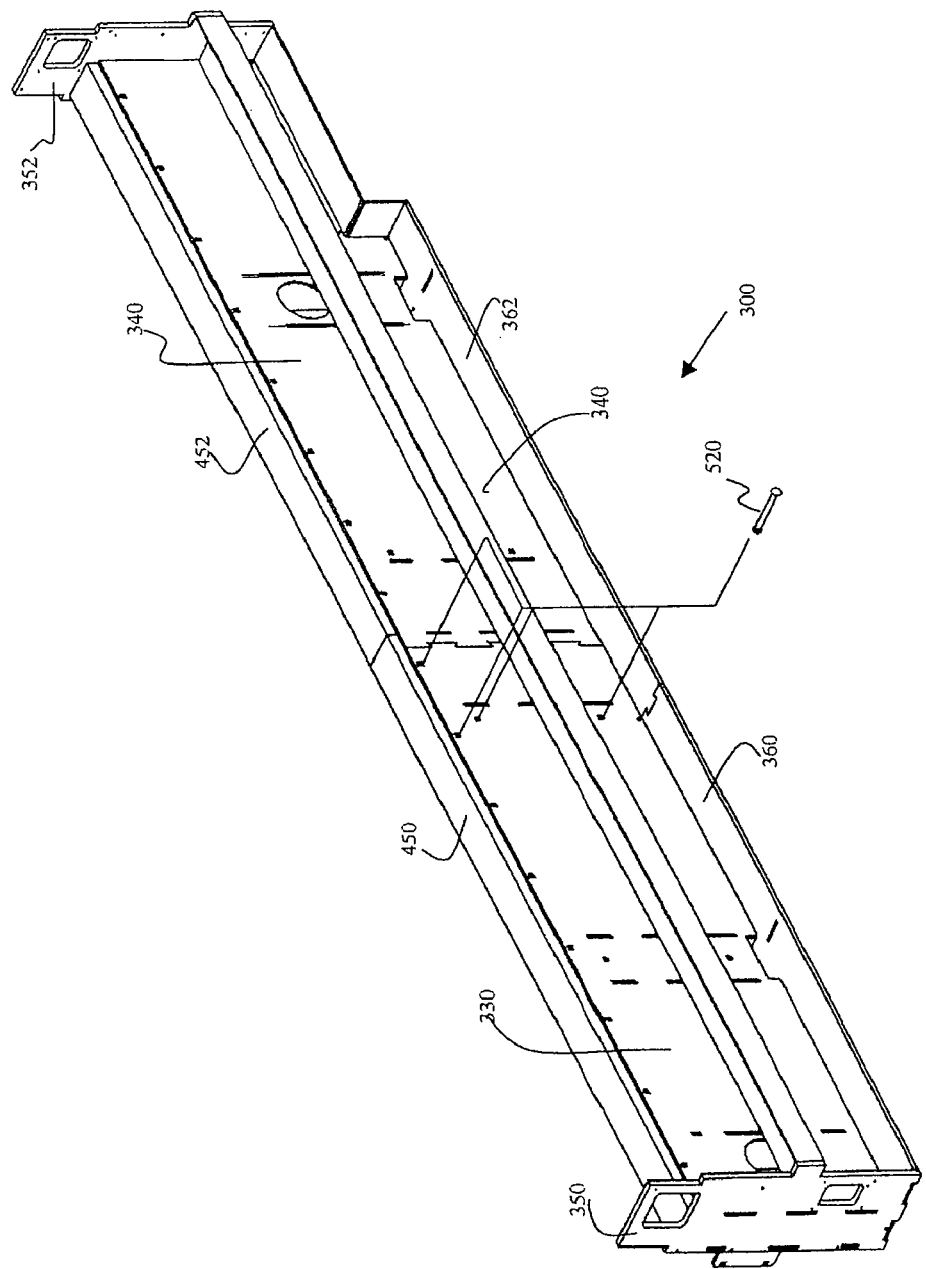
FIG. 12 is an assembled view of a bed lower unit.
Figure 13:
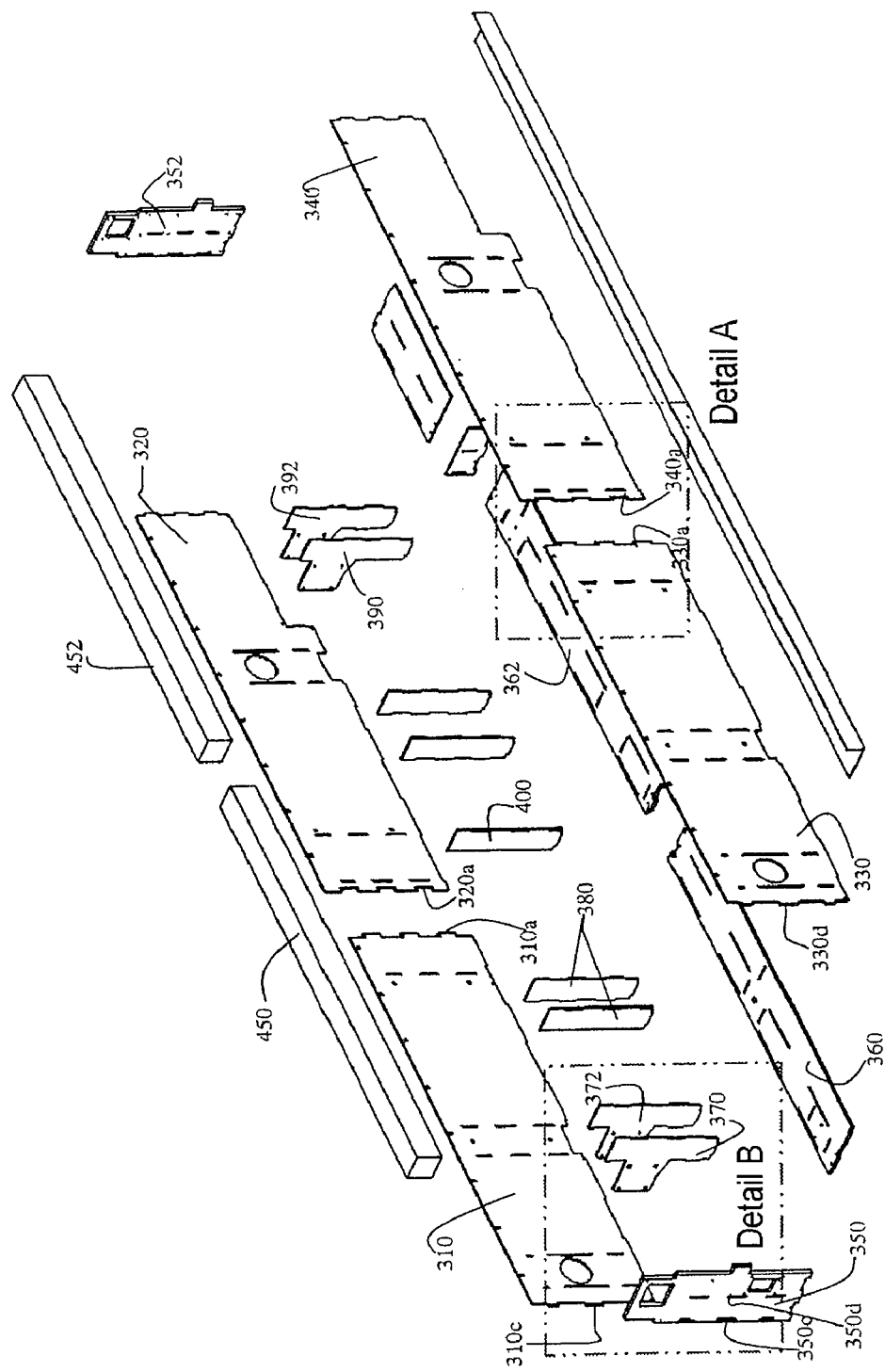
FIG. 13 is an exploded view of the bed lower unit.

FIG. 12 is an assembled view of the bed lower unit 300, and FIG. 13 is an exploded view.

The bed lower unit 300 has four side plates 310, 320, 330, 340 and bottom plates 360, 362 and is provided with ribs 370, 372, 380, 390, 392, 400 and so on having various shapes for connecting these side plates to the bottom plates.

Figure 14:
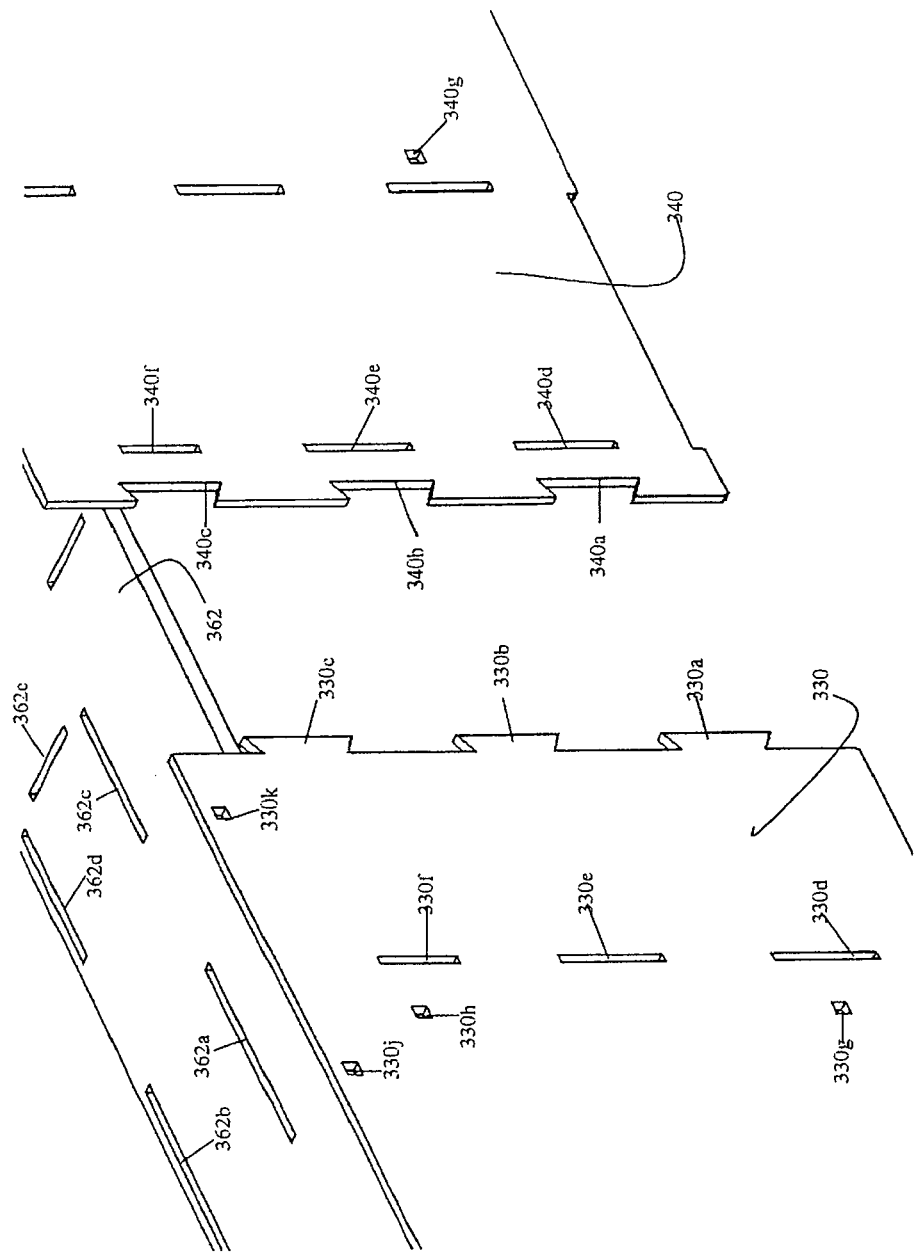
FIG. 14 is a detailed view of A part of FIG. 13.
Figure 15:
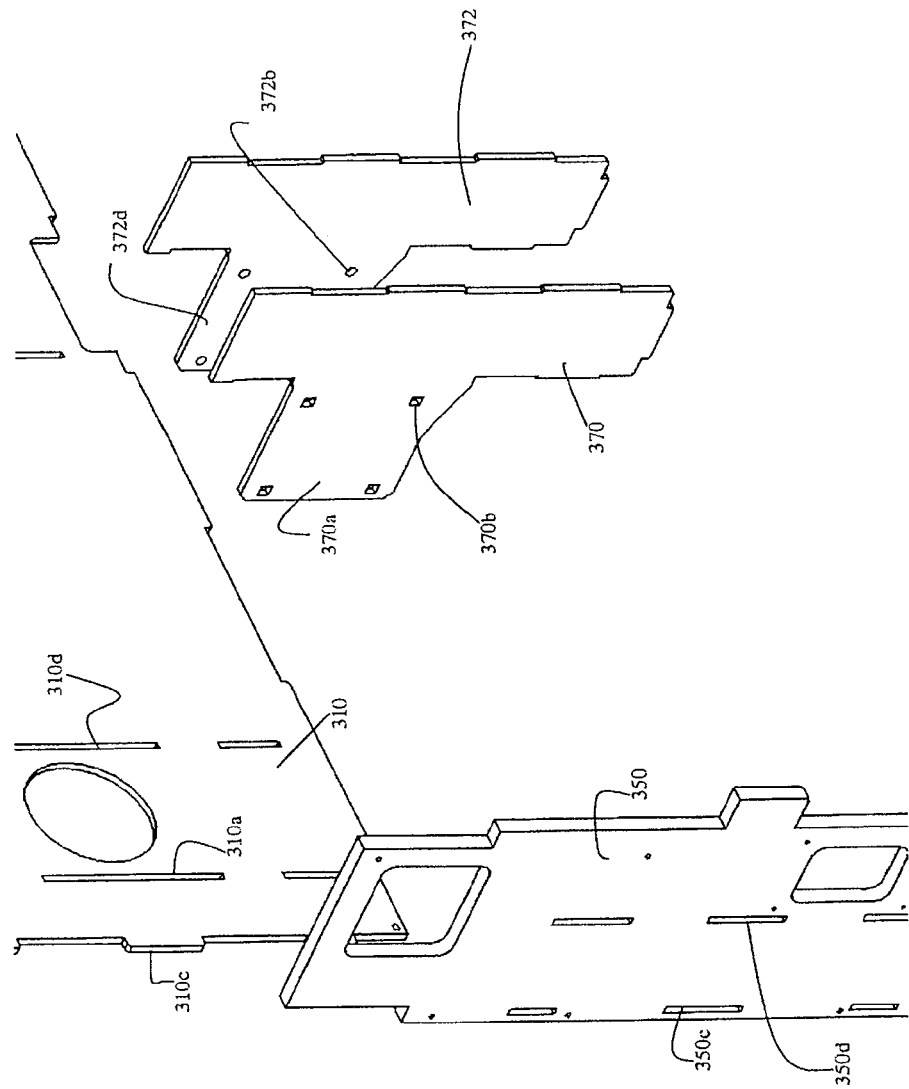
FIG. 15 is a detailed view of B part of FIG. 13.

FIG. 14 shows a detail of A part of FIG. 13, and FIG. 15 shows a detail of B part.

The two side plates 310 and 320 are constituted into a single side plate unit by combining a joint structure using a dovetail tenon 310a formed at each of the ends and a dovetail tenon groove 320a.

Since the side plate unit is assembled and constituted by two side plates, there is no need to use a large-sized laser machine for machining of each side plate and productivity and machining accuracy are improved.

Similarly, the side plate 330 and the side plate 340 are also constituted into a single side plate unit by combining a dovetail tenon 330a and a dovetail tenon groove 340a.

FIG. 14 shows a joint structure of the side plate 330 and the side plate 340.

Three dovetail tenons 330a, 330b, 330c are provided at an end of the side plate 330. On the other hand, three dovetail tenon grooves 340a, 340b, 340c are formed at an end of the side plate 340.

By combining these three dovetail tenons with the dovetail tenon grooves, the two side plates are assembled into a single side plate unit.

The side plate unit 330 has slits 330d, 330e, 330f and so on to which the projection portions of the rib are inserted and the side plate unit 330 is provided with square holes 330g, 330h, 330j, 330k and so on for attaching a fastening unit, which will be described later.

Similarly, the side plate 340 is also provided with slits 340d, 340e, 340f and so on to which the projection portions of the rib are inserted and a square hole 340g and so on for attaching the fastening unit.

The bottom plate 362 also has slits 362a, 362b, 362c, 362d to which the projection portions formed at a lower part of the side plate are inserted and a slit 362e to which the projection portion of the rib is inserted.

As shown in FIG. 15, a plurality of projection portions are provided at the end of the side plate 310, and a projection portion 310c is inserted into a corresponding slit 350c of an end side plate 350. Into a slit 350d formed on the end side plate 350, a projection portion 330d at the end of the side plate 330 shown in FIG. 13 is inserted. By combining the plurality of projection portions provided at the end of the side plate with the plurality of slits formed at the end side plate, a bed unit with high rigidity can be constituted.

A pair of ribs 370, 372 have flange portions 370a, 372d and pierce the slits 310a, 310d of the side plate 310 and project. These flange portions 370a, 372d are used for mounting a lateral beam connecting the right and left bed units.

One rib 370 has a square hole 370b for the fastening unit, while the other rib 372 has a circular hole 372b for bolt piercing.

Figure 16:
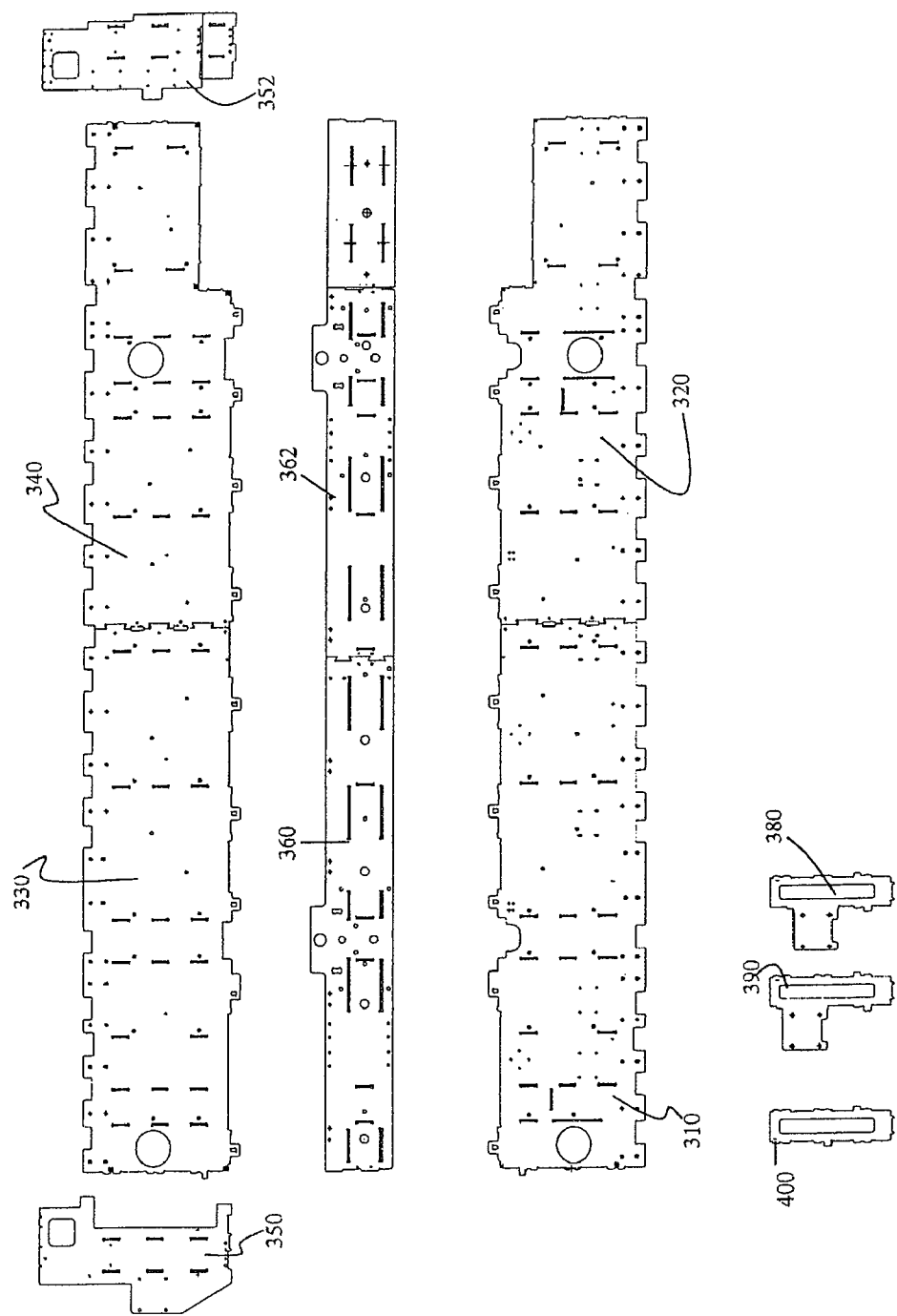
FIG. 16 is a list view of laser machining members of the bed lower unit.

FIG. 16 shows a list of laser machined members of the members constituting the bed lower unit.

Figure 17:
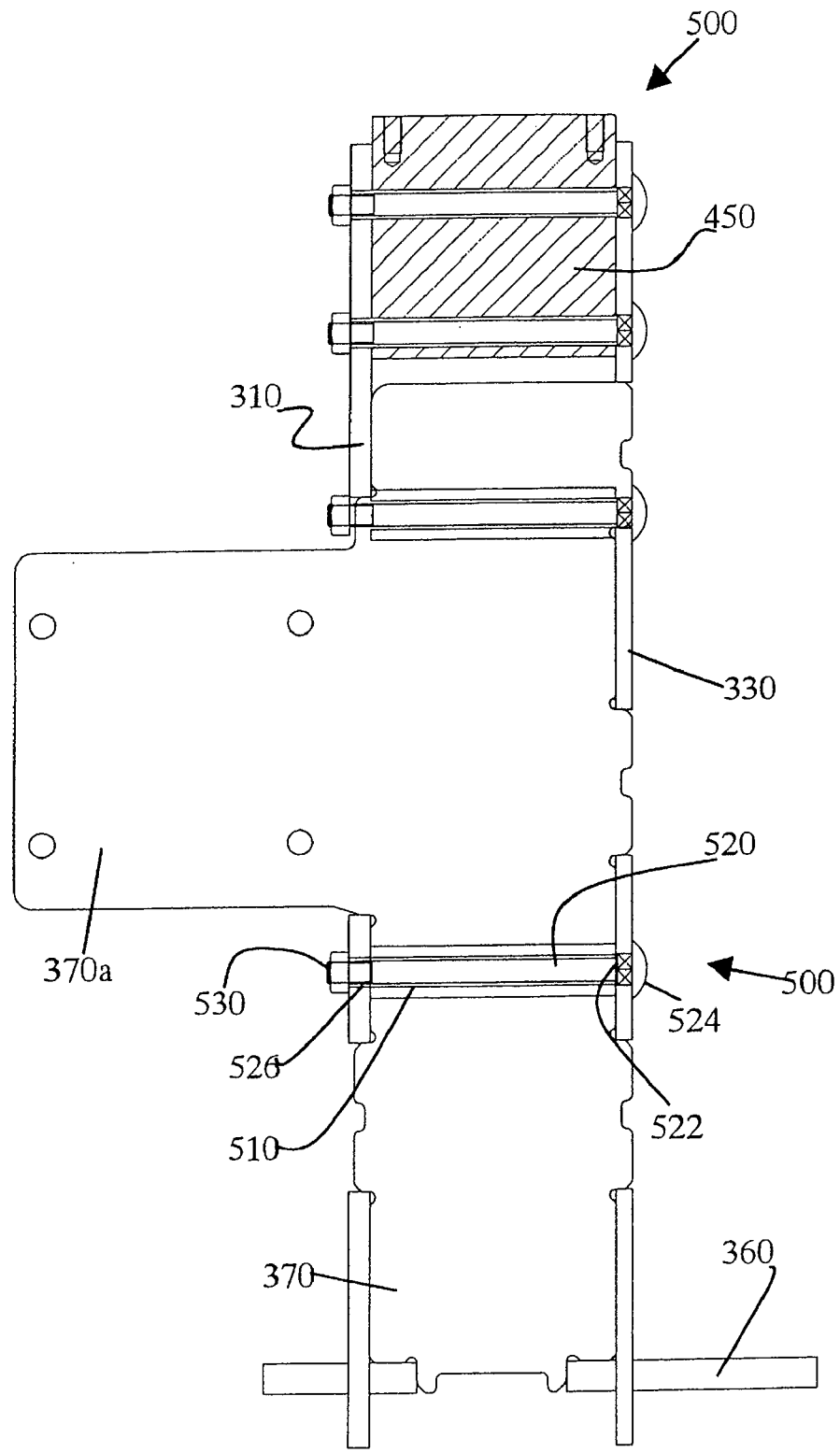
FIG. 17 is a sectional view of the bed lower unit.

FIG. 17 shows a sectional structure of the bed. The opposing side plates 310, 330 are joined by the rib 370 and fastened by a fastening unit 500. The fastening unit 500 is constituted by a pipe 510, a bolt 520 inserted into the pipe and a nut 530.

The pipe 510 is pressed into contact with inner wall portions of the two side plates 310, 330. The bolt 520 has a round head portion 524, a square column portion 522 formed at a seated portion immediately below the round head portion and a screw portion 526.

By inserting this bolt 520 into a square hole formed on one side plate 330, the bolt 520 is locked. Then, by screwing the nut 530 with the screw portion 526 of the bolt projecting outside of the other side plate 310, the two side plates 310, can be firmly assembled in cooperation with the pipe 510.

Moreover, a rectangular column shaped member 450 is disposed at upper parts of the opposing side plates 310, 330 and joined by the fastening unit 500.

A plurality of ribs are disposed inside the two side plates 310, 330. Moreover, a projection portion provided at a lower end of the side plate is inserted into a slit of a base plate.

By the above-mentioned construction, a bed unit with high rigidity can be manufactured.

The mechanism for improving the rigidity has highly accurate projection portions (tenons) and slits (mortices) machined with a dimensional accuracy of about 0.05 to 0.1 mm by laser machining and constitutes a highly rigid integral structure by fastening a large number of highly accurate constituent members machined with a dimensional accuracy of about 0.05 to 0.01 mm by a laser machine with a large number of projection portions and slits arranged at random as well as a large number of fastening bolts or the like so as to offset dimensional tolerance and to integrally assemble those elements.

What is claimed is:

1. A method of manufacturing a column of a machine tool, comprising steps of:
    preparing a column front member provided with a plurality of slits on a face and a plurality of projection portions on ends of the column front member by laser cutting a sheet metal;
    preparing a column rear member provided with a plurality of slits on a face and a plurality of projection portions on ends of the column rear member by laser cutting a sheet metal;
    preparing two side covers provided with a plurality of slits on faces of the two side covers and a plurality of recess portions on outer surfaces of the two side covers by laser cutting a sheet metal;
    preparing ribs provided with a plurality of projection portions by laser cutting a sheet metal; and
    assembling the column front member and the column rear member by inserting the plurality of projection portions of the ribs into the plurality of slits of the column front member and the column rear member, and by inserting and fixing the plurality of projection portions of the ends of the column front member and the column rear member into the plurality of slits of the side covers.

2. A method of manufacturing a bed unit of a machine tool, comprising steps of:
    preparing two side plate units provided with a plurality of slits and square holes by laser cutting a sheet metal;

preparing one bottom plate unit provided with a plurality of slits by laser cutting a sheet metal;

preparing two end plates provided with slits by laser cutting a sheet metal;

preparing ribs provided with a plurality of projection portions;

preparing a plurality of fastening units wherein each fastening unit is constituted by a pipe, a bolt inserted in the pipe, and a nut;

assembling the two side plate units, one bottom plate unit, ribs and two end plates by inserting respective projection portions into respective slits; and fastening two side plate units by pressing the pipe into contact with inner walls of the side plate units, inserting the bolt into the pipe and screwing the nut to the bolt.

3. The method of claim 2, wherein the step of preparing two side plate units comprises:

preparing two plates provided with a dovetail tenon and a dovetail tenon groove at adjacent ends of the plates; and combining the dovetail tenon into the dovetail tenon groove and assembling one side plate unit.

4. The method of claim 2, wherein the step of preparing one bottom plate unit comprises:

preparing two plates provided with a dovetail tenon and a dovetail tenon groove at adjacent ends of the plates; and combining the dovetail tenon into the dovetail tenon groove and assembling one bottom plate unit.

* * * * *